(12) United States Patent
Certin

(10) Patent No.: US 8,855,913 B2
(45) Date of Patent: Oct. 7, 2014

(54) APPARATUS FOR PLANNING TRIPS COMBINATION, METHOD FOR THE SAME, AND PROGRAM FOR THE SAME

(75) Inventor: Laurent Certin, Nagoya (JP)

(73) Assignee: DENSO CORPORATION, Kariya (JP)

( * ) Notice: Subject to any disclaimer, the term of this patent is extended or adjusted under 35 U.S.C. 154(b) by 136 days.

(21) Appl. No.: 13/017,201

(22) Filed: Jan. 31, 2011

(65) Prior Publication Data

US 2011/0191017 A1 Aug. 4, 2011

(30) Foreign Application Priority Data

Feb. 4, 2010 (JP) .................................. 2010-23448

(51) Int. Cl.
G01C 21/00 (2006.01)
G01C 21/34 (2006.01)

(52) U.S. Cl.
CPC .................................. *G01C 21/343* (2013.01);
*G01C 21/3484* (2013.01)
USPC .......................................... 701/400; 701/200

(58) Field of Classification Search
USPC .......................................................... 701/200
See application file for complete search history.

(56) References Cited

U.S. PATENT DOCUMENTS

| 6,401,034 | B1* | 6/2002 | Kaplan et al. ................. 701/416 |
| 8,010,285 | B1* | 8/2011 | Denise .......................... 701/417 |
| 2003/0195694 | A1 | 10/2003 | Kozak et al. |
| 2004/0044464 | A1* | 3/2004 | Sugiura et al. ................ 701/200 |
| 2005/0027436 | A1 | 2/2005 | Yoshikawa et al. |
| 2005/0187707 | A1* | 8/2005 | Yokota et al. ................. 701/209 |
| 2005/0273251 | A1* | 12/2005 | Nix et al. ...................... 701/201 |
| 2005/0283311 | A1 | 12/2005 | Ohler |
| 2007/0282638 | A1* | 12/2007 | Surovy .............................. 705/4 |
| 2010/0268449 | A1* | 10/2010 | Feng ............................. 701/201 |

FOREIGN PATENT DOCUMENTS

| JP | 11304522 A | 11/1999 |
| JP | 2000258177 A | 9/2000 |
| JP | 2002213982 A | 1/2002 |
| JP | A-2002-140399 | 5/2002 |
| JP | A-2002-350152 | 12/2002 |
| JP | A-2006-317341 | 11/2006 |
| JP | A-2007-170898 | 7/2007 |
| JP | A-2008-3027 | 1/2008 |

(Continued)

OTHER PUBLICATIONS

Office Action dated Feb. 5, 2013 in corresponding CN Application No. 201110036600.X (and English translation).

(Continued)

*Primary Examiner* — Maceeh Anwari
(74) *Attorney, Agent, or Firm* — Posz Law Group, PLC

(57) ABSTRACT

A drive management system proposes a trips combination, such as a combination of two regular trips and/or a side trip from an ongoing trip. A trips database stores a plurality of trips including regular trips. A regular trips combination proposing module automatically creates a trips combination of regular trips and proposes the trips combination to a user. The real-time trips combination proposing module finds out a trip combinable with an ongoing trip based on short-term needs which are retrieved from the trips database and proposes the trips combination to a user. The system proposes the trips combination and shows an impact which will be caused by the proposed trips combination. As a result, it is possible to support a user to plan a trips combination advantageous in some aspect.

15 Claims, 13 Drawing Sheets

(56) References Cited

FOREIGN PATENT DOCUMENTS

| | | |
|---|---|---|
| JP | 2008077311 A | 4/2008 |
| JP | 2008224508 A | 9/2008 |
| JP | A-2009-139129 | 6/2009 |

OTHER PUBLICATIONS

Search Report dated Dec. 26, 2013 in the corresponding FR application No. 1150799 (and English translation).

Office Action mailed Aug. 6, 2013 in corresponding JP Patent Application No. 2010-023448 (and English translation).

* cited by examiner

FIG. 3

| REGULAR TRIP DATA BASE | | | | | | |
|---|---|---|---|---|---|---|
| | | ATTRIBUTIVE INFORMATION | | | | |
| | TIME INFO. | PURPOSE/ DESTINATION | FREQUENCY | FLEXIBILITY | DOORS | PASSENGERS |
| 1 | | HOME | — | — | — | |
| 2 | | OFFICE | DAILY | LOW | | |
| 3 | | SUPERMARKET | BIWEEKLY | HIGH | | |
| 4 | | SPORTS CENTER | WEEKLY | HIGH | | |
| 5 | | PARENTS HOME | — | HIGH | | |
| 6 | | N/A | DAILY AFTERNOON | HIGH | TRUNK | 1 |
| PLANNED TRIP DATA BASE | | | | | | |
| 1 | | | | | | |
| 2 | | | | | | |
| | | | | | | |

APPARATUS FOR PLANNING TRIPS COMBINATION, METHOD FOR THE SAME, AND PROGRAM FOR THE SAME

CROSS REFERENCE TO RELATED APPLICATION

This application is based on Japanese Patent Application No. 2010-23448 filed on Feb. 4, 2010, the contents of which are incorporated herein by reference in its entirety.

FIELD OF THE INVENTION

The present invention relates to an apparatus for planning a trips combination, such as a driving trip of a vehicle, a method for the same, and a program product stored in a computer readable storage medium.

BACKGROUND OF THE INVENTION

Conventionally, a navigation system for a vehicle is known. The navigation system guides a route to a destination. To use the navigation system, a user plans a trip and inputs a destination.

In addition, in the following patent documents, it is proposed to support or help selecting a destination and planning a trip. The patent document 1 discloses an apparatus which stores history of user activities, and proposes a destination based on the history. The patent document 2 discloses an apparatus which provides a service based on history of user activities. The patent document 3 discloses an apparatus which proposes an alternative route to a destination, if unusual traffic condition is reported on a registered route. The patent document 4 discloses an apparatus which selects and proposes a route with less energy consumption from a plurality of potential routes. The patent document 5 discloses an apparatus, in a car-pooling system which plans a combination of a plurality of requests for vehicle usages.

PATENT DOCUMENTS

1: JP2009-139129A
2: JP2007-170898A
3: JP2005-49114A
4: JP2002-350152A
5: JP2002-140399A

SUMMARY OF THE INVENTION

Each conventional technique provides advantage in each aspect. For example, the apparatus in the patent document 4 can automatically select the best route from a plurality of potential routes. However, the plurality of routes is defined based on a destination decided and inputted by a user. Therefore, the user must still select a destination, and plan a trip to the destination. In addition, to select an appropriate trip, the user must evaluate a trip from some aspects such as energy consumption, a traveling time, and an environmental load. Therefore, to schedule a trip is still burdensome for a user.

In addition, the conventional techniques do not consider a combination of a plurality of trips as a way to make user's vehicle usage advantageous in some aspect. To combine at least two trips is even more burdensome for a user.

It is an object of the present invention to provide an apparatus and method which can support to plan a combination of a plurality of trips.

It is another object of the present invention to provide an apparatus and method which can support to plan a combination of a plurality of trips which is advantageous in some aspect.

It is a still another object of the present invention to provide an apparatus and method which can automatically select at least two combinable trips from a plurality of trips.

It is a yet another object of the present invention to provide an apparatus and method which can automatically select a side trip which is possible to be combined with a presently on-going trip from a plurality of planned trips.

The following technical solution can be employed to achieve the object.

In one aspect of the present invention, an apparatus for planning a trips combination for driving a vehicle comprises a trips database which stores a plurality of trips including at least a regular trip described by attributive information which shows habits of a user. The apparatus further comprises a primary trip setting module which sets a primary trip to be combined into the trips combination, a secondary trip setting module which sets a secondary trip combinable with the primary trip based on the attributive information stored in the trips database, and a proposing module which proposes to a user the trips combination in which the primary trip and the secondary trip, are combined.

According to the invention, it is possible to propose to a user a trips combination based on habits of the user.

In the other aspect of the present invention, at least one of a minimum departure time, a maximum arrival time, a mean departure time, a mean arrival time, a trip time length, a departure point, a destination point, a purpose, frequency, flexibility, door operation, and number of passengers is contained in the attributive information, and is used for setting the secondary trip.

In the other aspect of the present invention, the apparatus may further comprises an evaluating module which evaluates impact caused by the trips combination in which the primary trip and the secondary trip are combined. In this case, the proposing module proposes only the trips combination which causes advantageous impact.

In the other aspect of the present invention, the plurality of trips stored in the trips database include a plurality of regular trips, the primary trip setting module sets one of the regular trips stored in the trips database as the primary trip, and the secondary trip setting module sets a regular trip as the secondary trip, the regular trip being another one of the regular trips stored in the trips database and being combinable with the primary trip.

In the other aspect of the present invention, the plurality of trips stored in the trips database include a planned trip indicating a plan of a user, the primary trip setting module sets a presently ongoing trip as the primary trip, and the secondary trip setting module sets a destination point which is considered to be likely accepted by a user on the ongoing trip based on one of the trips stored in the trips database, and sets a trip to the destination point as the secondary trip.

In the other aspect of the present invention, the secondary trip setting module selects a short-term trip, which would be taken soon, from the plurality of trips stored in the trips database based on attributive information stored in the trips database, sets a destination point which is considered to be likely accepted by a user on the ongoing trip based on attributive information of the short-term trip, and sets a trip to the destination point as the secondary trip.

In the other aspect of the present invention, a method for planning a trips combination for driving a vehicle, comprises the steps of storing in a trips database a plurality of trips including at least a regular trip described by attributive information which shows habits of a user. The method further comprises the steps of setting a primary trip to be combined into the trips combination, setting a secondary trip combinable with the primary trip based on the attributive information stored in the trips database, and proposing to a user the trips combination in which the primary trip and the secondary trip are combined.

In the other aspect of the present invention, at least one of a minimum departure time, a maximum arrival time, a mean departure time, a mean arrival time, a trip time length, a departure point, a destination point, a purpose, frequency, flexibility, door operation, and number of passengers is contained in the attributive information, and is used for setting the secondary trip.

In the other aspect of the present invention, the method may further comprises a step of evaluating impact caused by the trips combination in which the primary trip and the secondary trip are combined. In this case, the proposing step proposes only the trips combination which causes advantageous impact.

In the other aspect of the present invention, the storing step stores a plurality of regular trips in the trips database, the primary trip setting step sets one of the regular trips stored in the trips database as the primary trip, and the secondary trip setting step sets a regular trip as the secondary trip, the regular trip being another one of the regular trips stored in the trips database and being combinable with the primary trip.

In the other aspect of the present invention, the storing step stores a planned trip indicating a plan of a users in the trips database, the primary trip setting step sets a presently ongoing trip as the primary trip, and the secondary trip setting step sets a destination point which is considered to be likely accepted by a user on the ongoing trip based on one of the trips stored in the trips database, and sets a trip to the destination point as the secondary trip.

In the other aspect of the present invention, the secondary trip setting step selects a short-term trip, which would be taken soon, from the plurality of trips stored in the trips database based on attributive information stored in the trips database, sets a destination point which is considered to be likely accepted by a user on the ongoing trip based on attributive information of the short-term trip, and sets a trip to the destination point as the secondary trip.

In the other aspect of the present invention, a program product stored in a computer readable storage medium, which when executed, performs the steps in the method for planning a trips combination for driving a vehicle.

The reference numbers with parentheses in claims and in the above are just for indicating correspondence to components or modules described in the following embodiments and do not limit the scope of the invention.

BRIEF DESCRIPTION OF THE DRAWINGS

Additional objects and advantages of the present invention will be more readily apparent from the following detailed description of preferred embodiments when taken together with the accompanying drawings. In which:

FIG. 3 is a chart showing contents of a trips database;

DETAILED DESCRIPTION OF THE PREFERRED EMBODIMENTS

First Embodiment

Figure 1:
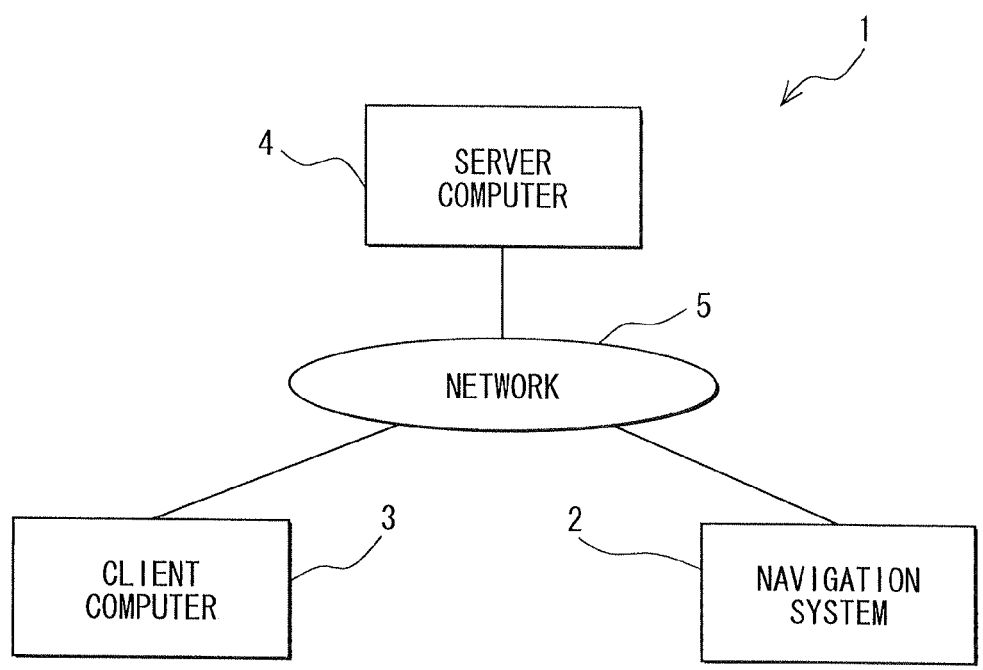
FIG. 1 is a block diagram showing a drive management system according to an embodiment of the present invention.

Hereinafter, the present invention is described in detail by referring to an embodiment of the present invention. The embodiment is a drive management system which helps a user to manage driving of a vehicle. FIG. 1 is a block diagram showing a drive management system according to an embodiment of the present invention.

The drive management system 1 includes a navigation system 2, a client computer 3, a server computer 4, and a network 5. The navigation system 2 is mounted on the vehicle. The navigation system 2 calculates a route from a departure point to a destination point set by a user, and displays the route on a display device to perform a route guidance function. The client computer 3 is placed in a home of the user, for example. The network 5 works as a communication device which enables data communication among the navigation system 2, the client computer 3 and the server computer 4. At least one of the navigation system 2 and the client computer 3 works as a user interface device of the drive management system 1. The drive management system 1 further includes a program product stored in a computer readable storage medium, which may be installed in at least one of the navigation system 2, the client computer 3, and the server computer 4, which when executed, causes at least one of the navigation system 2, the client computer 3, and the server computer 4 to, perform the steps of a method for planning a trips combination or to perform as an apparatus for planning a trips combination. In other words, the program product causes at least one of the navigation system 2, the client computer 3, and the server computer 4 to, perform as modules and/or steps described later.

Figure 2:
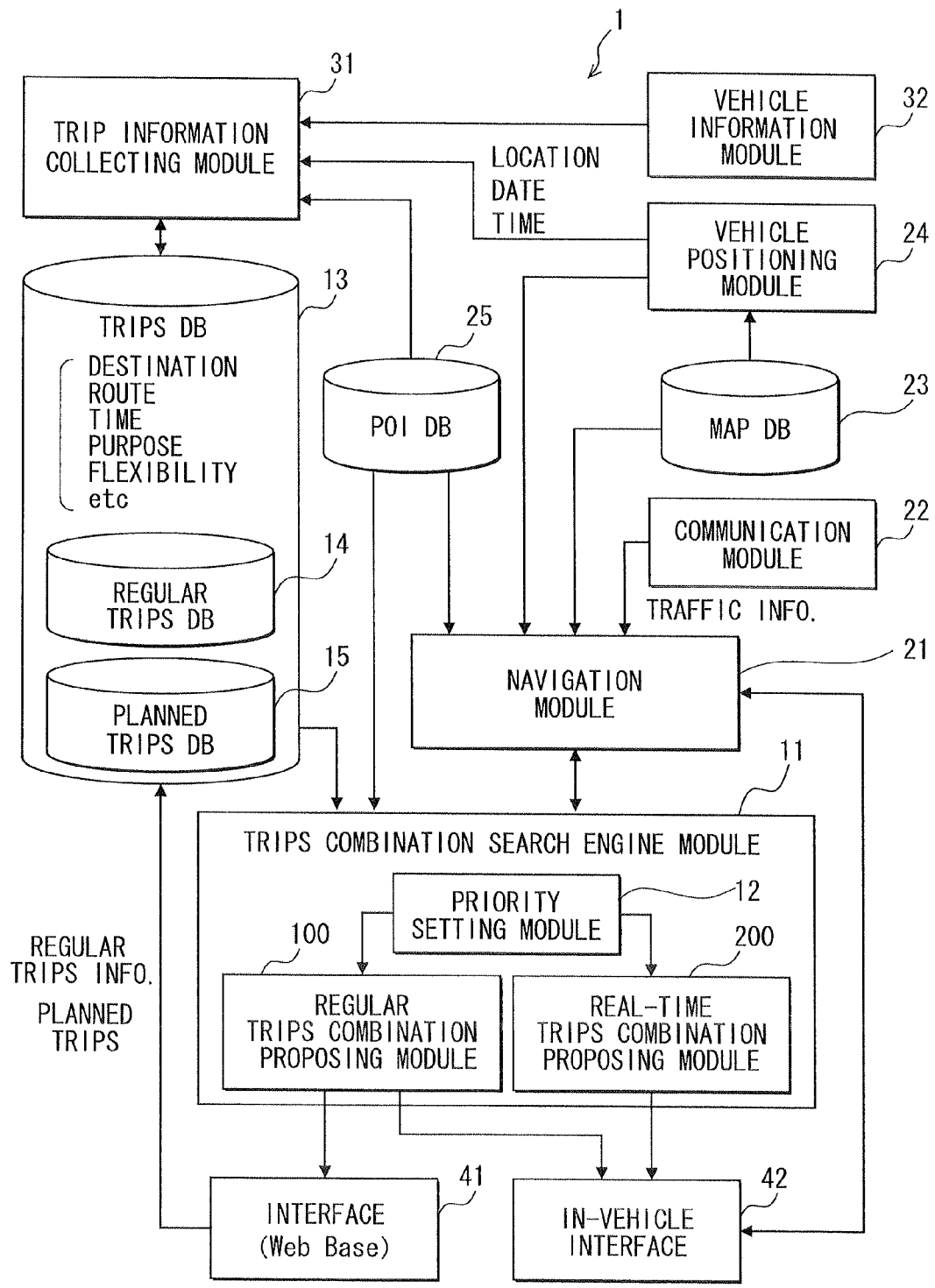
FIG. 2 is a block diagram showing a functional configuration of the drive management system.

FIG. 2 is a block diagram showing a functional configuration of the drive management system. A trips combination search engine module 11 has a priority setting module 12 and at least one of a regular trips combination proposing module 100 and a real-time trips combination proposing module 200. The regular trips combination proposing module 100 proposes to a user a trips combination in which a plurality of regular trips are combined. The real-time trips combination proposing module 200 proposes to a user a trips combination in which a side trip combinable with a presently ongoing trip and the ongoing trip are combined. The priority setting module 12 is operated by a user. The priority setting module 12 sets an index which can be used to evaluate the trips combination or to sort the trips combinations. As the index a certain aspect relevant to an operation of a vehicle can be used. For example, an amount of emission of an environmentally harmful substance, operation cost, operation time, operation distance, etc can be used as an index. The index may also be referred to as a main interest of the user. The module 11 creates and proposes a trips combination based on information stored in the trips database 13, information retrieved from a navigation module 21, and information retrieved from a POI (Point Of Interest) database 25.

The trips database 13 stores attributive information about a plurality of trips. The plurality of trips may include a regular trip and a planned trip. The regular trip has already taken by a vehicle or a user at least once. The regular trip is taken on a regular basis, e.g. daily, weekly, biweekly, and monthly. Therefore, the regular trips reflect and indicate habits of a user. The planned trip is a trip which is planned but has not yet actually taken. The trips database 13 includes a regular trips database 14 for storing the regular trips and a planned trips database 15 for storing the planned trips.

The navigation module 21 is provided mainly by the navigation system 2. The navigation module 21 carries out route calculation and route guidance based on information retrieved from peripheral device, such as a communication module 22, a map database 23, a vehicle positioning module 24 and the POI database 25. The communication module 22 provides traffic information which may show traffic congestion by communication with a traffic information center. The map database 23 provides map data. The vehicle positioning module 24 locates a present position of the vehicle. The vehicle positioning module 24 may be provided by a navigation satellite system, such as a GPS (Global Positioning System). The vehicle positioning module 24 provides information which shows a location, date, day, and time. The POI database 25 provides information about a position requested. For example, the name of the building in a specific position and information including a purpose etc., are provided.

The system 1 may optionally include a trip detecting module 31. The trip detecting module 31 automatically collects information about a trip based on an operation record of the vehicle, and registers it into the trips database 13. For example, in a case that the vehicle is operated from a home to a specific office building on weekdays from Monday to Friday, the trip detecting module 31 records a regular trip for the purpose of commutation.

The system 1 includes an interface 41. The interface 41 is provided by the client computer 3. For example, the interface 41 is connected with the system 1 via the network 5, such as the Web. The interface 41 displays a trips combination provided from the regular trips combination proposing module 100 to a user. The interface 41 may be configured to display a trips combination provided from the real-time trips combination proposing module 200. In addition, the interface 41 receives and inputs information indicative of whether a trips combination was accepted by the user or not. In response to the input information, the navigation module 21 performs route guidance based on the accepted trips combination. In addition, the interface 41 enables a user to operate the trips database 13. For example, the user can perform database operation such as a registration of new regular trip, a correction of the information about registered trip, a registration of planned trip, through the interface 41.

The system 1 further includes an in-vehicle interface 42 mounted on the vehicle. The in-vehicle interface 42 is provided by the navigation system 2. The in-vehicle interface 42 displays to a user a trips combination provided from the real-time trips combination proposing module 200. The in-vehicle interface 42 may display a trips combination provided from the regular trips combination proposing module 100. In addition, the in-vehicle interface 42 receives and inputs information indicative of whether the trips combination was accepted by the user or not. In response to the input, information, the navigation module 21 performs route guidance based on the accepted trips combination. In addition, the in-vehicle interface 42 enables a user to operate the trips database 13. For example, the user can perform database operation, such as a registration of new regular trip, a correction of the information about registered trip, a registration of planned trip, through the in-vehicle interface 42.

FIG. 3 is a chart showing contents of the trips database 13. The trip database 13 stores a plurality of records that correspond to trips. Each record includes a lot of attributive information. The attributive information may include time information, a departure point, a destination point, a purpose, frequency, flexibility, door operation, number of passengers, etc. The time information may include a minimum departure time, a maximum arrival time, a mean departure time, a mean arrival time, a trip time length etc.

Figure 4:
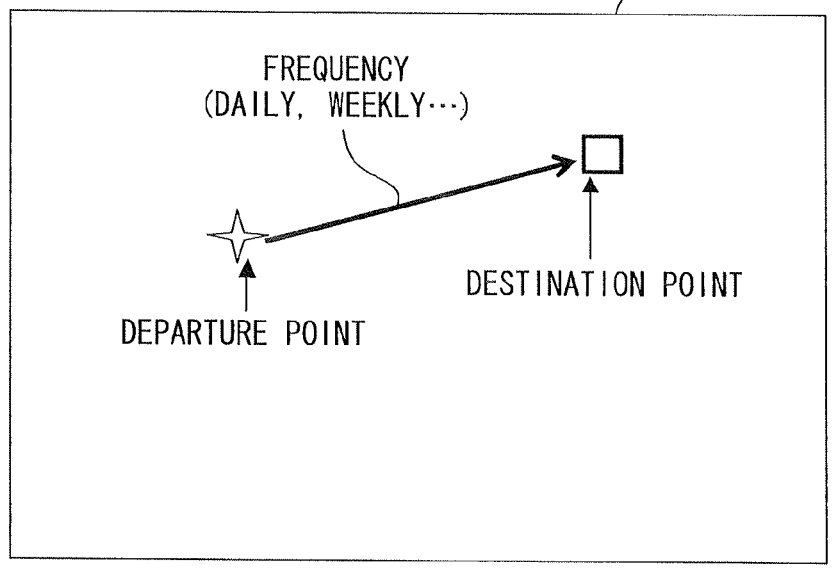
FIG. 4 is a plan view of a map image showing an example of the contents of the trips database.

FIG. 4 is a plan view of a map image showing an example of the contents of the trips database 13. As illustrated, a trip is a one-way trip from a specific departure point to a specific destination point with no intermediate stop.

Figure 5:
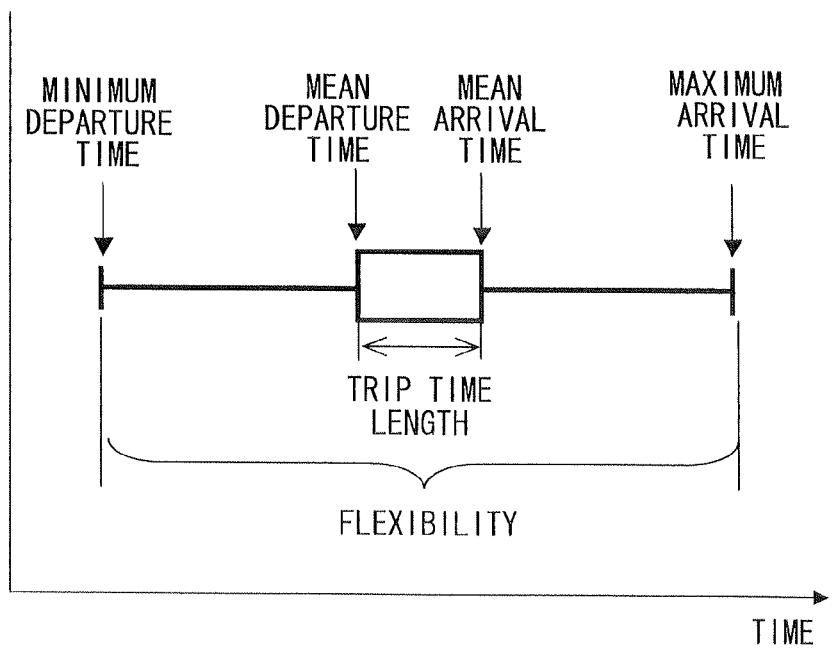
FIG. 5 is a graph showing an example of the contents of the trips database.

FIG. 5 is a graph showing an example of the contents of the trips database 13. Each trip is described by a minimum departure time and a maximum arrival time as information indicative of both ends of the trip. A period of time between the minimum departure time and the maximum arrival time shows a total flexibility of the trip. Further, each trip is also described with a mean departure time and a mean arrival time. A period of time between the mean departure time and the mean arrival time is a trip time length.

The flexibility is a period of time in which a trip can be undertaken. For example, a commute to work may show very low flexibility, as user may have to leave almost always at the same time and arrive at the same time. On the other hand, a trip to the supermarket may show more flexibility as user may be able to go on different time during the weekend. This way, a trip shall be described by its usual time length, departure and arrival time but also with its minimum departure and maximum arrival times.

The frequency information may show an interval between similar trips, such as daily, weekly, bi-weekly, monthly. The frequency information may show specific dates, days or time. The frequency information may be considered as an index indicative of flexibility of the trip. For example, a trip to a supermarket on Saturday and a trip to a supermarket on Thursday evening may be stored in one record by using the frequency information. In this case, the frequency information shows "Saturday" or "Thursday evening", and may be interpreted and utilized to indicate that this trip has certain flexibility for weekends or evenings. Alternatively, a trip to a supermarket on Saturday and a trip to a supermarket on Thursday evening may be stored in two separate records. Such data structures allow the system to determine trip flexibility as flex as possible.

The purpose information shows a reason of a trip. For example, it can be something like "shopping" or "sports center." But, the purpose information shall be selected to be linkable with the POI database 25 in order to allow a search of similar types of locations. For example other "shopping" place or other "sports center" can be search criteria for looking up the POI database 25. The purpose of the trip can be automatically deducted from the POI database 25 using a stop location. For example, if the stop is made on a parking lot of a supermarket, the system 1 can assume that the trip purpose is "supermarket". Other vehicle information can be used to make such purpose assumption. For example, some specific purpose has strong linkage to some specific information, such as a time length of the stop, an opening of trunk and/or back doors, the number of passengers before and after the stop. However, a user shall always be able to input real correct information through the interface 41, 42.

These pieces of information for describing a trip can be automatically processed by the trip information collecting module 31. In detail, a departure time, an arrival time and a time length may be available in a vehicle tracking history. In addition, a user may manually enter these pieces of information through the interface 41, 42. The drive management system 1 may includes at least one of an automated trip information entering module, such as the trip information collecting module 31, and a manual trip information entering module such as the interfaces 41 and 42.

Figure 6:
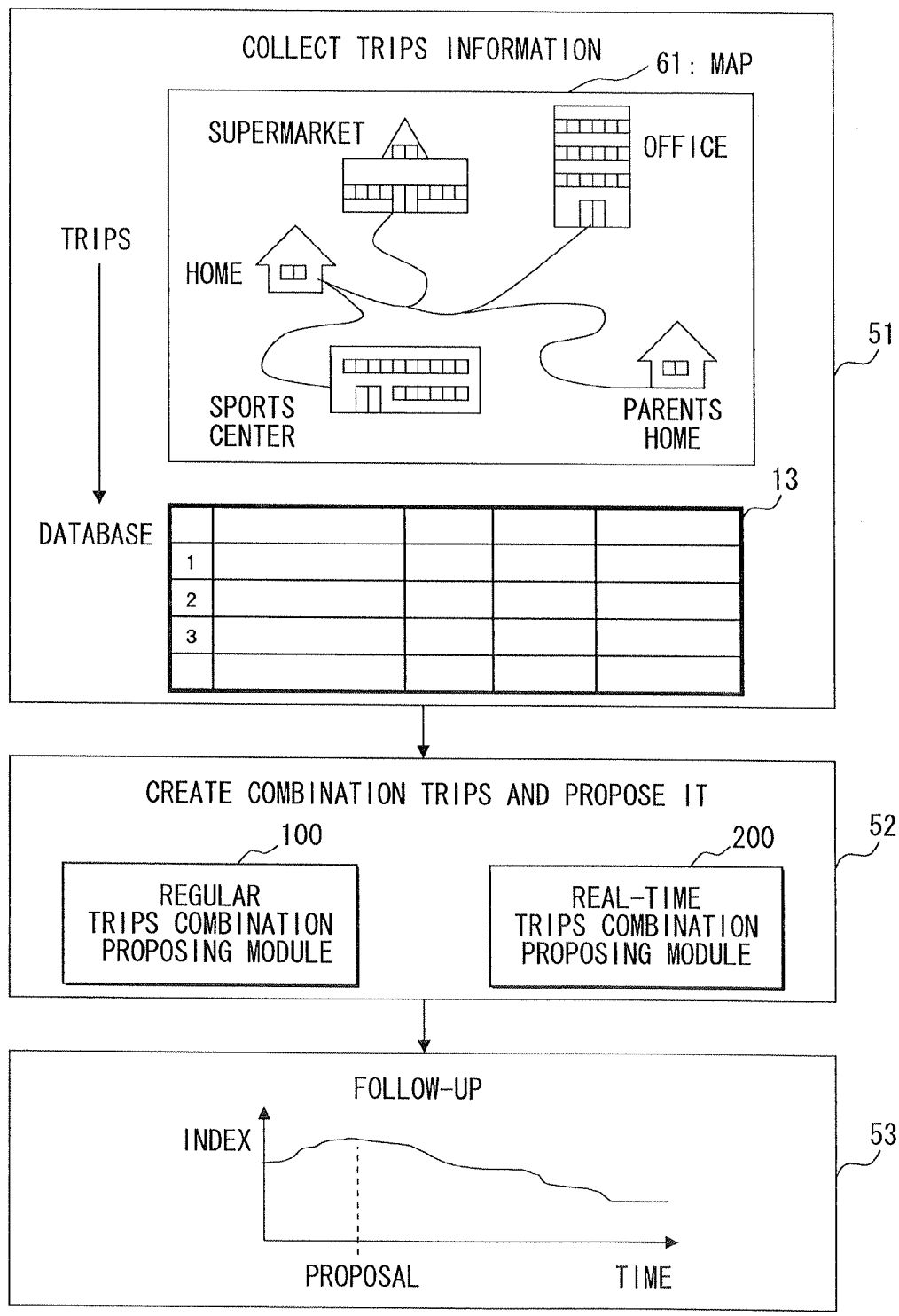
FIG. 6 is a flowchart showing a flow of processing of the drive management system.

FIG. 6 is a flowchart showing a flow of processing of the drive management system. The drive management system 1 may include a collecting step 51 and a proposing step 52. In addition, the system 1 may optionally include a following up step 53. In the collecting step 51, the system 1 collects information about a plurality of trips. For example, a plurality of trips among points on a map 61. In the collecting step 51, the system 1 registers and stores the collected information into the trips database 13. The collecting step 51 may be performed by allowing the user to enter information about a plurality of predetermined trips. In the proposing step 52, the system 1 creates a trips combination, and proposes the created trips combination to a user. The system 1 proposes the trips combination and shows an impact, such as reduction of CO2 emission, which will be caused by the proposed trips combination. The trips combination is created by the regular trips combination proposing module 100 or the real-time trips combination proposing module 200. After the proposing step 52, if the user accepts the created and proposed trips combination, the system 1 performs route guidance for the trips combination by the navigation system 2. In the following up step 53, the system 1 performs a follow-up for a result of the trips combination by showing data which indicates a difference between before and after the trips combination is actually taken. For example, in a case that the user selects CO2 emission as an index, the system shows an amount of CO2 emission for a period of time including before and after following the proposal of the trips combination. The data indicative of the result of the index, such as CO2 emission, cost, and distance of a trip, can be retrieved by using a route calculation algorithm in the navigation system 2.

Figure 7:
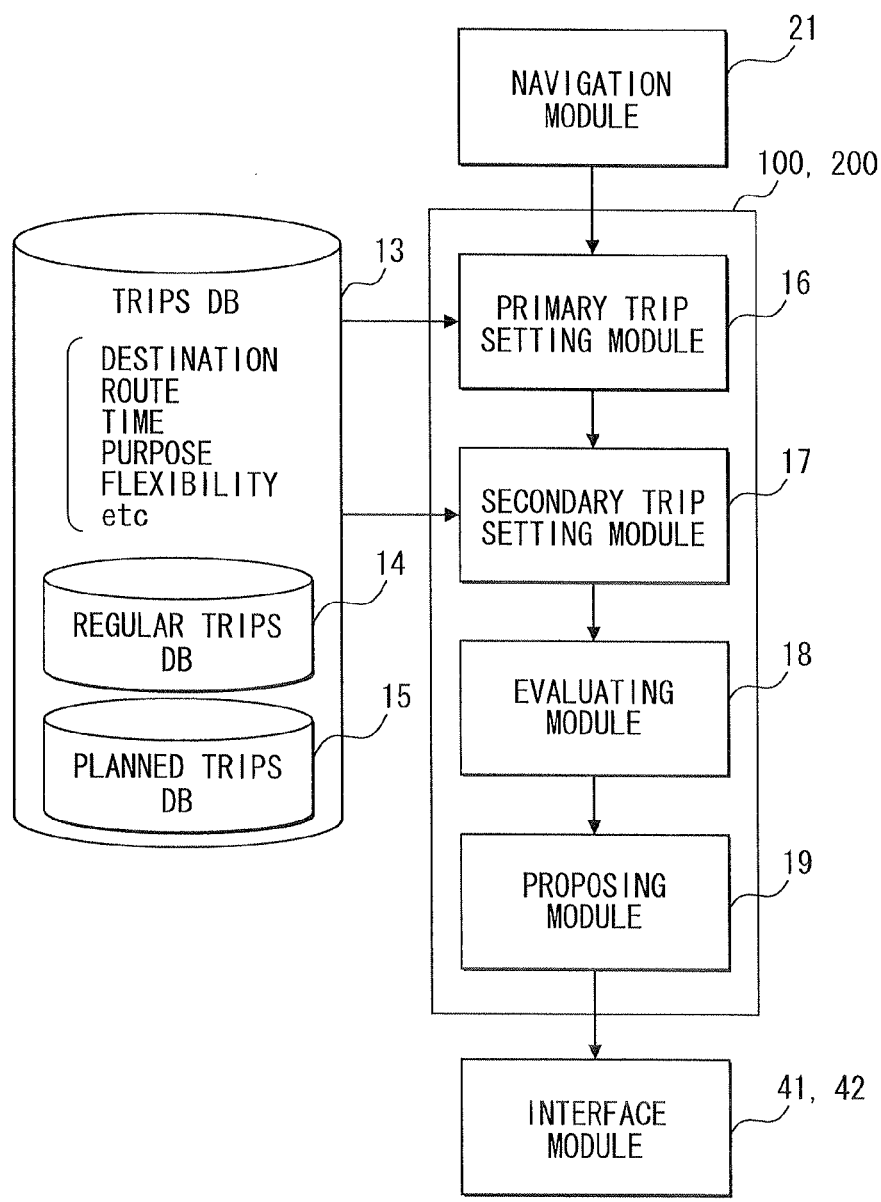
FIG. 7 is a block diagram showing a functional configuration of proposing modules.

FIG. 7 is a block diagram showing a functional configuration common to both of proposing modules 100 and 200. The proposing modules 100 and 200 may include a primary trip setting module 16, a secondary trip setting module 17, an evaluating module 18, and a proposing module 19. The primary trip setting module 16 sets a primary trip which is used to create a trips combination. In the regular trips combination proposing module 100, one of the regular trips is selected as the primary trip. In the real-time trips combination proposing module 200, the ongoing trip is selected as the primary trip. One of a plurality of trips registered in the trips database 13, which satisfies predetermined condition may be selected as the primary trip. Alternatively, the primary trip may be set up by the user. The secondary trip setting module 17 sets the secondary trip which is combinable with the primary trip. One of a plurality of trips registered in the trips database 13, which satisfies predetermined condition may be selected as the secondary trip. The secondary trip may be selected as a trip which is combinable with the primary trip. The secondary trip may be selected as a trip which does not require significant change in time and/or purpose of both the primary trip and the secondary trip when the primary trip and the secondary trip are combined in a trips combination. The secondary trip may be selected as a trip which can be taken continuously from the primary trip. The secondary trip may be selected so that one of the primary trip and the secondary trip can be completed within a range of flexibility of the other one of the primary trip and the secondary trip. The secondary trip may be selected as a trip having attributive information which does not interfere with attributive information of the primary trip. For example, it is desirable to avoid combining two trips which have the attributive information indicating the identical purpose. In addition, it is desirable that the secondary trip is a trip which causes advantageous impact when it is combined with the primary trip. The evaluating module 18 evaluates impact caused by a trips combination in which the primary trip and the secondary trip are combined. The trips combination may cause either advantageous impact or disadvantageous impact. The trips combination causing disadvantageous impact may be ignored. The proposing module 19 proposes a trips combination in which the primary trip and the secondary trip are combined to a user through the interfaces 41 and 42. The proposing module 19 may be configured to propose only a trips combination which causes advantageous impact. For example, the proposing module 19 is configured to not propose a trips combination which causes negative impact, and propose a trip combination which causes positive impact.

Figure 8:
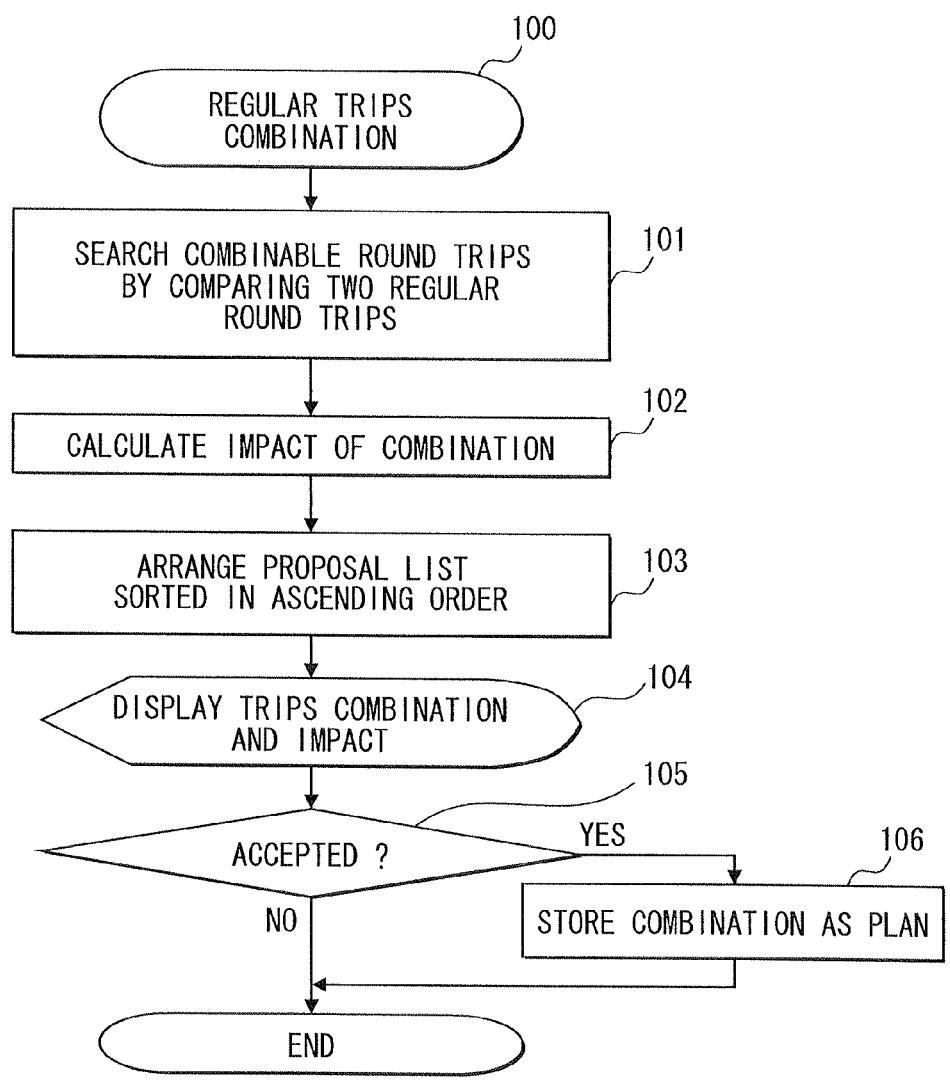
FIG. 8 is a flowchart showing a flow of processing for proposing a regular trips combination.

FIG. 8 is a flowchart showing a flow of processing for proposing a regular trips combination. This regular trips combination processing provides a part of the proposing step 52. In this processing, at least two trips in a schedule of the user are known by the system 1. In particular, the trips database 13 gives access to user's regular trips with their respective flexibility. The system 1 checks whether user's habits can be changed to achieve better efficiency. This can be checked at any time, such as at home on a dedicated web site by using the interface 41.

The system 1 goes through the list of regular trips and for trips with similar destination and departure point and overlapping flexibilities. If a minimum departure time of a trip is prior to a maximum arrival time over a certain threshold time period, combination with another trip can be considered. A trip time length and route re-calculation is used to analyze the possibility of doing such a combination in respect of the concerned trips flexibility. The propositions of trips combination is suggested to a user, e.g. via the interface 41, by showing a potential advantage according to user's main interests, such as CO2 emissions, cost or time. For example, the system 1 may combine a regular trip to a supermarket and a regular trip to an office, and may propose a trips combination in which a weekly trip to a supermarket is arranged after his work on Friday instead of Saturday morning in order to reduce CO2 emission.

Referring to FIG. 8, the routine may be started at any time. In a step 101, the system 1 searches a combinable pair of two round trips by comparing two regular round trips. This processing may be called as 2 by 2 regular trips information comparison. In the following description, trips considered in the system 1 are referred to by a symbol T and the number, e.g. T1.

In the step 101 the system 1 picks up a pair of two round trips from the regular trips database 14 as a potential pair. One of the round trips is selected as the primary trip, and the other one is selected as the secondary trip. Then, the system 1 determines that whether the pair of round trips is combinable or not. If a backward trip of the primary trip T1 and a forward trip of the secondary trip T2 satisfy predetermined conditions, those trips T1 and T2 can be handled as a combinable pair. In detail, the system 1 checks the following conditions: (1) If a departure point of T2 is the same as a destination point of T1; (2) If a destination point of T2 is different from a departure point of T1; and (3) If flexibility of T2 overlaps with flexibility of T1.

Figure 9:
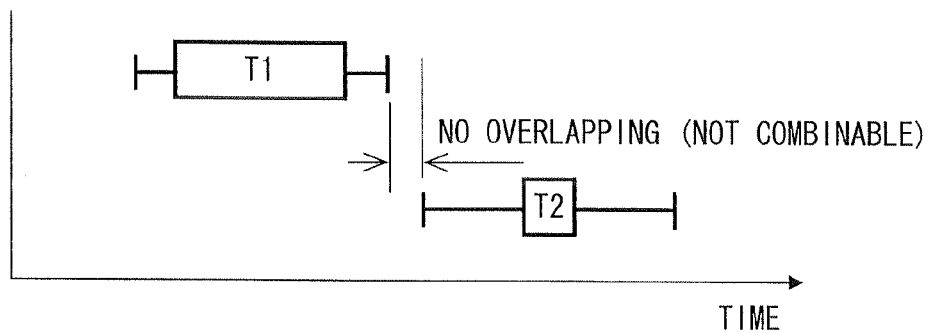
FIG. 9 is a graph showing two trips which are not combinable.
Figure 10:
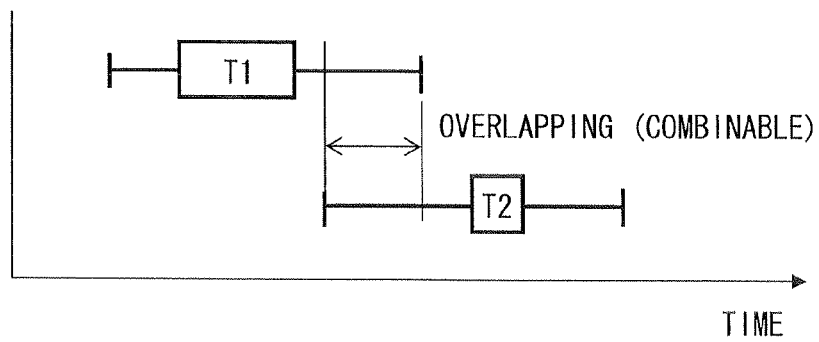
FIG. 10 is a graph showing two trips which are combinable.

FIG. 9 is a graph showing two trips T1 and T2 which are not combinable. FIG. 10 is a graph showing two trips T1 and T2 which are combinable. Flexibilities of two trips T1 and T2 may be evaluated and determined based on an overlapping of trips. In a case illustrated in FIG. 9, the trip T1 and the trip T2 are not combinable because two trips T1 and T2 have no overlapping. Contrary, if an intersection of the two periods of time is not null, two trips are combinable. In a case of FIG. 10, the trip T1 and the trip T2 have an overlapping and are combinable into one trip.

Returning to FIG. 8, if these three conditions are true, then a combination of these two trips T1 and T2 shall be considered. The combination would result in one trip called a finking trip T3 with the following characteristics: (1) a departure point of T3=a departure point of T1; (2) a destination point of T3=a destination point of T2; (3) a minimum departure time of T3=a minimum departure time of T1; (4) a maximum arrival time of T3=a maximum arrival time of T2; and (5) a frequency of T3=the lowest of frequencies of T1 and T2.

Figure 11:
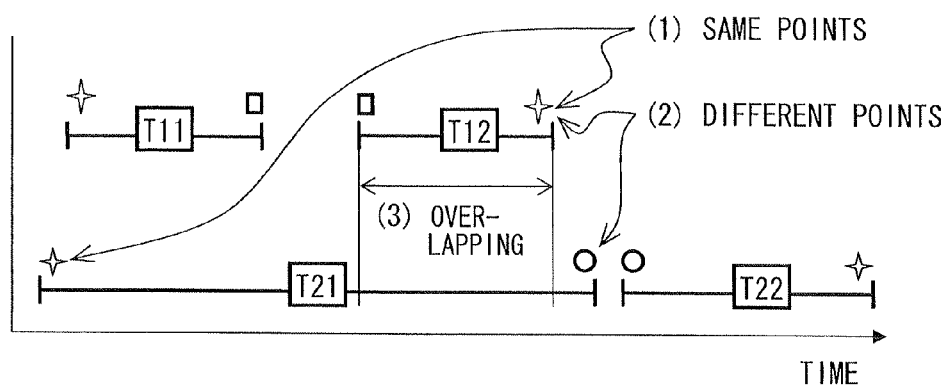
FIG. 11 is a graph showing two combinable round trips.
Figure 12:
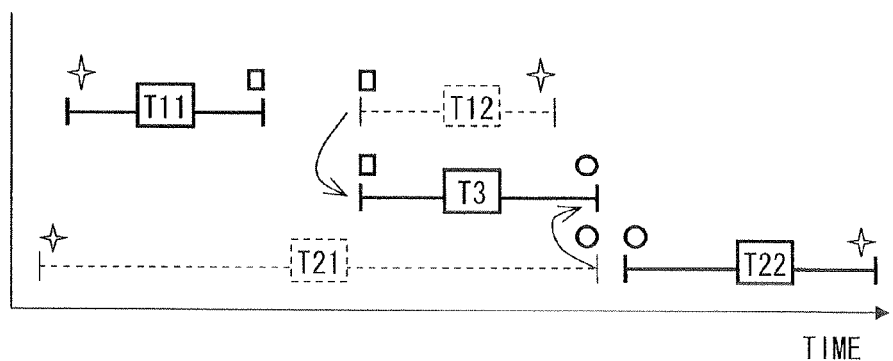
FIG. 12 is a graph showing a trips combination.

FIG. 11 is a graph showing two combinable round trips. FIG. 12 is a graph showing a trips combination. The primary trip T1 includes a forward trip T11 and a backward trip T12. The secondary trip T2 includes a forward trip T21 and a backward trip T22. In an example of FIG. 11, the conditions (1), (2), and (3) are satisfied. Then, the backward trip T12 and the forward trip T21 can be combined into a linking trip T3. As shown in FIG. 12, a linking trip T3 is created instead of the trips T12 and T21. The trips combination created by the step 101 includes the forward trip T11, the linking trip T3 and the backward trip T22.

Returning to FIG. 8, in the step 101, the system 1 may be configured to avoid a combination of two trips which have identical or similar attributive information. For example, the system 1 may ignore a pair of regular round trips which may be categorized into the same purposes, such as shopping. When the purpose of the regular trip is necessary to perform the proposing processing, it is possible to use not only the purpose information but also an assumed purpose. In a case that the purpose information is not available, it is possible to assume a purpose of the regular trip based on the other attributive information. For example, a regular trip which is described with "it is held on daily basis on afternoon", and "a trunk is opened" may be a trip for shopping purpose. In this case, operating condition of the vehicle can be taken into consideration in the processing for proposing a trips combination.

In a step 102, the system 1 evaluates an impact of the trips combination according to the main interest of the user by performing a new route calculation in the navigation module 21. The impact may be also referred to as a benefit or an advantage. The system 1 performs processing in the steps 101 and 102 for all potential pairs of trips. In a step 103, the system 1 arranges a proposal list of all the trips combinations created in the step 101, which may be sorted in an ascending order based on the impact calculated in the step 102.

In a step 104, the system 1 proposes the trips combination to the user by displaying the proposal list with the impact. In the step 104, it may be configured to propose a trips combination only when the trips combination shows sufficient impact compatible with the flexibilities of the combined two round trips. In a step 105, the system 1 monitors an input from the user to determine whether the user accepts the proposal or not. If the user accepts the trips combination proposed in the step 104, in a step 106, the system 1 stores the trips combination as a planned trip. As a result, the navigation module 21 can perform route guidance for the trips combination which is accepted by the user.

Figure 13:
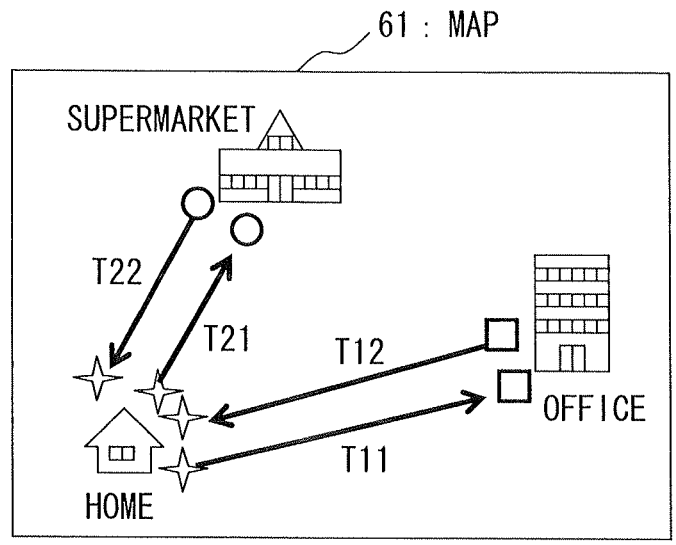
FIG. 13 is a plan view of a map image showing the two combinable round trips shown in FIG. 11.
Figure 14:
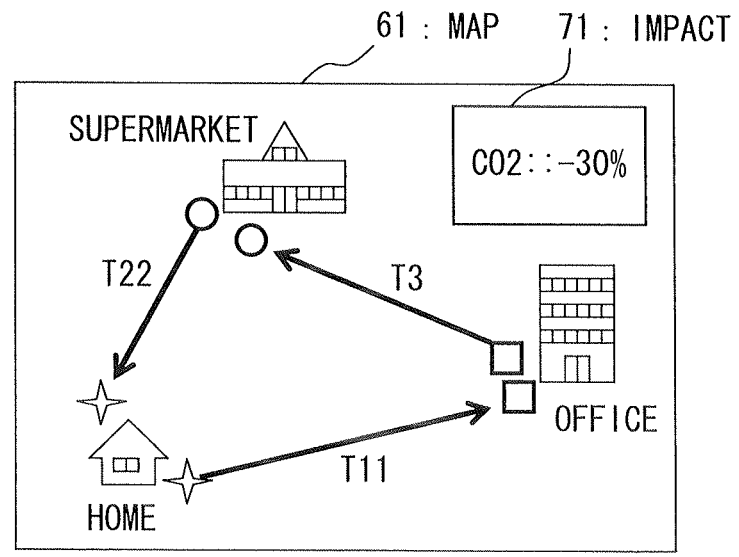
FIG. 14 is a plan view of a map image showing the trips combination shown in FIG. 12.

FIG. 13 is a plan view of a map image 61 showing two combinable round trips shown in FIG. 11. FIG. 14 is a plan view of a map image 61 showing a trips combination shown in FIG. 12. FIGS. 13 and 14 merely illustrate an example of the regular trips combination processing, and does not limit the scope of the invention. The drawings illustrate a case where the regular trips database 14 stores at least a regular round trip to an office including regular trips T11 and T12, and a regular round trip to a supermarket including regular trips T21 and T22. In this case, the system 1 may propose a trips combination including the forward trip T11, the linking trip T3 and the backward trip T22. The system 1 may show the image of FIG. 14 on the interface 41 to propose the trips combination. The system 1 shows the trips combination T11-T3-T22 and an impact 71 caused by the proposed trips combination T11-T3-T22. For example, the impact 71 may be displayed as a reduction ratio in $CO_2$ emission.

According to the regular trips combination proposing module 100, the primary trip setting module 16 sets the regular trip as the primary trip. The secondary trip setting module 17 also sets the regular trip as the secondary trip. As a result, it is possible to propose a trips combination which reflects habits of a user.

According to the regular trips combination proposing module 100, it is possible to automatically propose a trips combination, such as a combined trip of two regular trips. As a result, it is possible to support a user to plan a trips combination which may be advantageous in some aspect. In addition, it is possible to propose a trips combination which meets needs of a user, such as $CO_2$ emission, cost or time. A user can be free from burdensome work for planning a trips combination.

Figure 15:
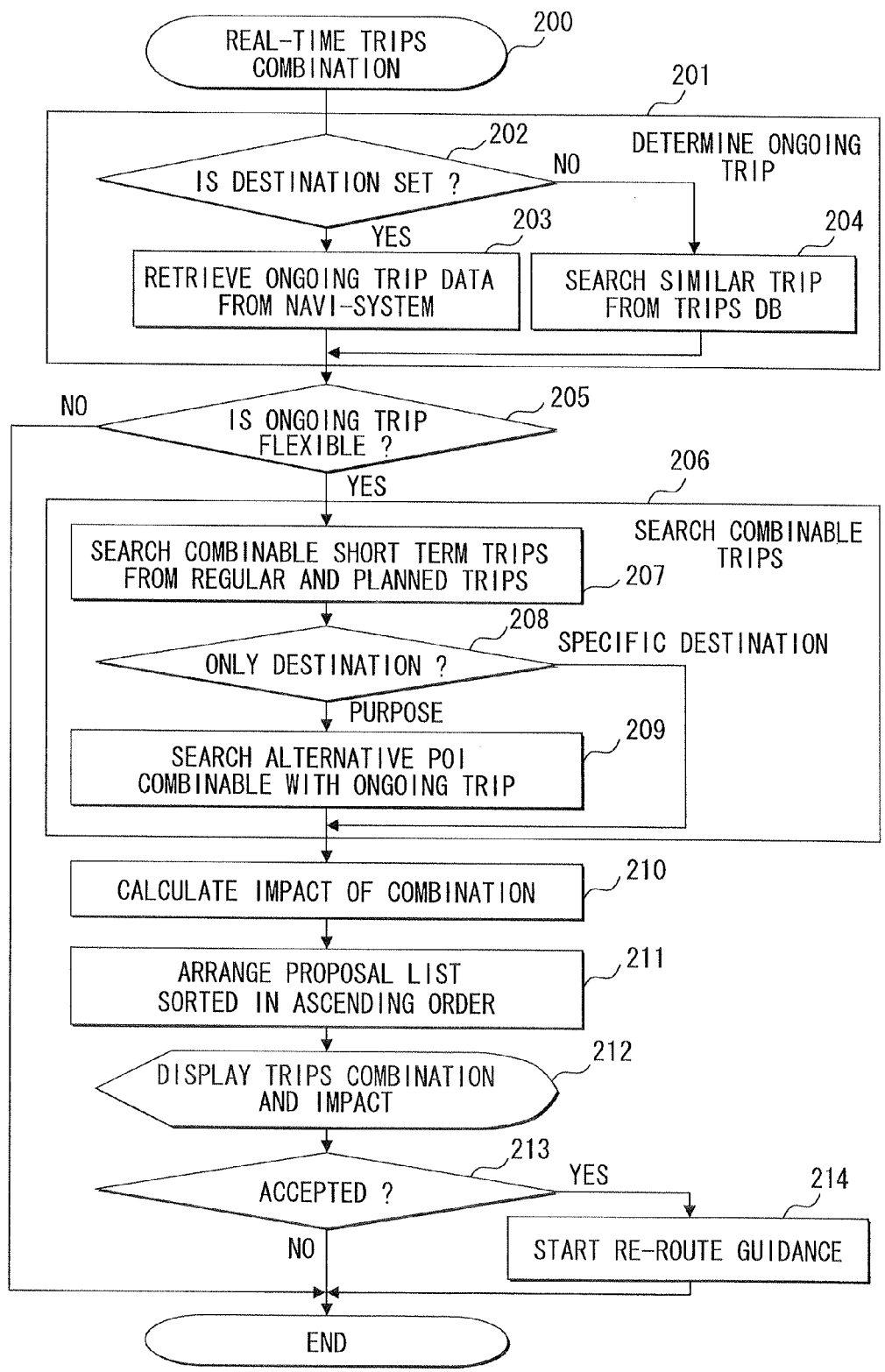
FIG. 15 is a flowchart showing a flow of processing for proposing a real-time trips combination.
Figure 16:
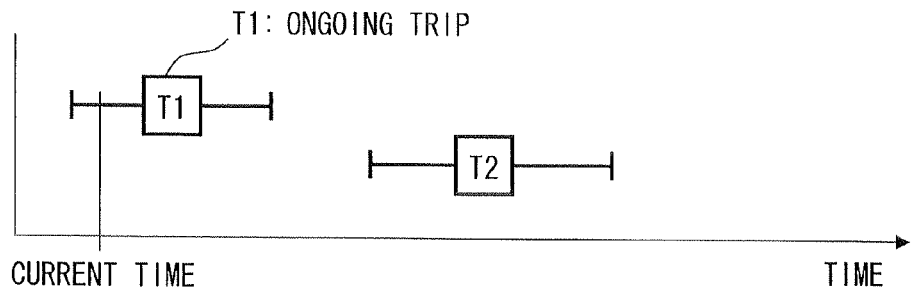
FIG. 16 is a graph showing an ongoing trip.
Figure 17:
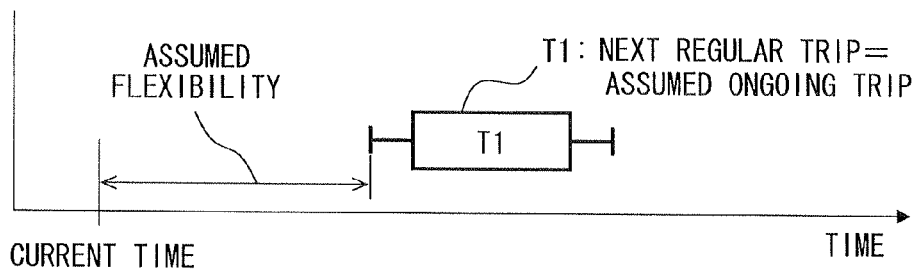
FIG. 17 is a graph showing an assumed ongoing trip.
Figure 18:
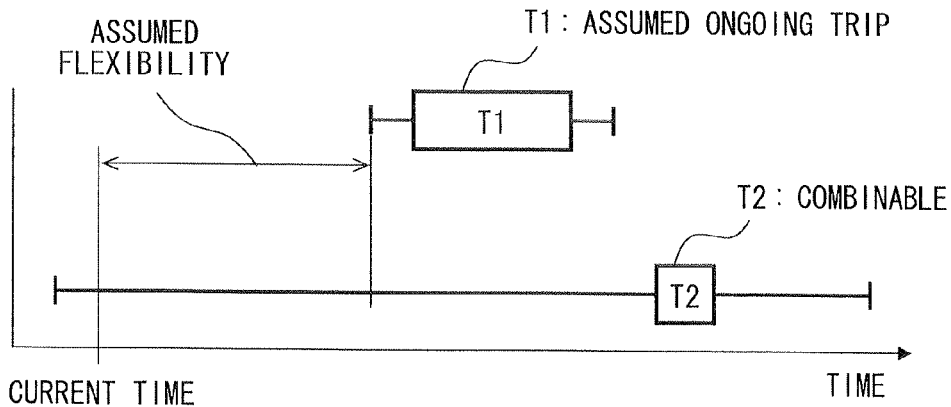
FIG. 18 is a graph showing the assumed ongoing trip and a combinable trip.

FIG. 15 is a flowchart showing a flow of processing for proposing a real-time trips combination. FIG. 16 is a graph showing an on-going trip T1. FIG. 17 is a graph showing an assumed on-going trip T1. FIG. 18 is a graph showing the assumed on-going trip T1 and a combinable trip T2.

This real-time trips combination processing provides a part of the proposing step 52. In this processing, at least one trip in a schedule of the user is known by the system 1. In particular, the trips database 13 gives access to both the user's regular trips and planned trips with their respective flexibility. This processing is provided while driving a vehicle on a real-time basis. Whether a destination of an ongoing trip is known or not, the system 1 can search for trips combinations opportunities based on the regular trips and the planned trips. In other words, the processing proposes an on-route opportunity to an additional trip. For example, if a user is expected to visit a supermarket soon according to the regular trips, the system 1 may inform of nearby supermarket while driving. In this processing, the ongoing trip determined in a step 201 is the primary trip. A trip extracted in a step 206 is the secondary trip.

Referring to FIG. 15, the routine may be started at any time during a vehicle operation. To make the real-time trips combination possible, the processing is configured to answer the following questions: (1) What is the flexibility of ongoing trip? (2) What are acceptable additional trips of a user? and (3) What are interesting trips combination opportunities nearby a current position or on route?.

To answer the question (1), the system 1 determines ongoing trip in a step 201 and retrieves information indicative of flexibility of the ongoing trip. When the vehicle starts moving, the system 1 look for a destination and a route the user will use. In a step 202, the system 1 determines that whether a destination is set in the navigation system 2 or not. The user may enter the destination manually in the navigation system 2. If the user has set the destination and chosen a route in the navigation system 2, the ongoing trip can be easily determined by retrieving data from the navigation system 2 in a step 203.

If the user starts driving with no destination setting, the system 1 makes a prediction in a step 204. The system 1 tries to match current conditions, such as date and time, with regular trips in the regular trips database 14. The system 1 accesses the regular trips database 14 to find regular trips made on current trip weekday and time. If a regular trip can match current day and time, the system 1 retrieves a destination and a route of the ongoing trip from information of the regular trip. For example, as shown in FIG. 16, the system 1 assumes that the user is undertaking the regular trip T1. Therefore, if current trip is matched with a regular trip, flexibility information can be retrieved from the regular trips database 14. In a case that the maximum arrival time of the regular trip is over a certain threshold compared to the current time and the trip time length expectation, then the ongoing trip can be considered as flexible. If no regular trip is matched current day and time, the system 1 does not assume any destination and only searches for nearby trips combination opportunities.

If no regular trip is matched, the flexibility may be assumed using current day and time. The system 1 may use a default rule to consider the trip as opened to trip combination or not. For example, the system 1 may take into account current week day and time to make this assumption. It is recommended that a user can access and change the default rule. For example, it is recommended to allow a user to access setting to change the flexibility rules into several levels, such as "always consider my trips as flexible" and "never consider my trip as flexible on weekdays".

If no regular trip is matched, flexibility of the ongoing trip may be calculated according to the next regular trips. For example, as shown in FIG. 17, even if no regular trip is matched with the current time, the system 1 assumes the next regular trip T1 as an ongoing trip. In this case, flexibility of the ongoing trip can be obtained as a period of time up to the minimum departure time of the next regular trip T1.

Returning to FIG. 15, in a step 205, the system 1 determines that whether the ongoing trip has sufficient flexibility large enough to consider trips combination or not. If the flexibility is not large enough, the routine skips the following steps and end the processing. If the flexibility is large enough, the routine proceeds to a step 206.

To answer the question (2), in the step 206, the system 1 searches both the regular trips database 14 and the planned trips database 15 to find out a secondary trip which is suitable to be combined with the ongoing trip. For example, a trip which may be likely accepted by a user even during the ongoing trip is suitable as the secondary trip. In detail, a trip with short time length may be likely accepted. In addition, a trip which a user will take soon may be likely accepted. In this embodiment, the system 1 determines short-term needs for the user, and determines trips which meet the short-term needs.

In a step 207, to find out the secondary trip which meets the short-term needs, the system 1 searches the regular trips database 14 to find out a regular trip which has enough flexibility with the ongoing trip. For example, in a case of FIG. 18, a regular trip T2 is a good candidate for a trip combination as it shows high flexibility with the ongoing trip T1 and a short time length. The regular trip T2 is handled as the secondary trip. In this case, the regular trip is undertaken now. Then, the system 1 stores the destination of the secondary trip as a specific destination for possible trip combination in a short-term trip list.

If the purpose is also known, the system 1 stores the purpose of the secondary trip as a purpose for possible trip combination in the short-term trip list. For example, if the secondary trip is a regular trip which shows that a user goes to a specific supermarket every week-end, the name of the specific supermarket is stored as the specific destination, and the shopping is stored as the purpose. The name of the supermarket allows the system 1 to consider a trip to the same specific destination as a trip to be combined. The purpose, the shopping, allows the system 1 to consider a trip to the same purpose as a trip to be combined. This processing is advantageous to create a plurality of trip combinations which are likely accepted by a user. For example, if a user usually goes to a supermarket once a week and it has been 8 days since he last went to the supermarket, then, it is possible to expect the user to go to supermarket soon. Therefore, in order to meet the needs of the user, the system 1 considers two possible trip combinations, one is to go to the usual supermarket, and the other one is to go to a similar, supermarket which can be found nearby on the ongoing trip.

In the step 207, to find out the secondary trip which meets the short-term needs, the system 1 searches the planned trips database 15 too. The short-term needs are also determined using the planned trips of a user. The planned trips are manually entered by a user through the interface 41. The planned trips may be entered through an appropriate web site for example. The planned trips may be expressed as a form of "plan to go". The plan can either be precise location or more general purpose. For example, it may be "visit this place", "go to a gardening store", "go to restaurant", or "Go see the last James Bond movie". The purpose allows the system 1 to search the POI database 25 to find out an alternative destination. The definition of a purpose matches a search engine capability for the POI database 25.

To answer the question (3), the system 1 performs the following steps. At this point the system 1 knows the short-term trip list which stores the short-term trip with some descriptive information, such as a specific destination and/or a purpose. In a step 208, it is determined that the short-term trip listed on the short-term trip list is described with only a specific destination or not. In a case that the short-term trip is described with only a specific destination, the system 1 skips a step 209, since it seems that the user expects to go to the specific destination. In a case that the short-term trip is described with only a purpose or with both a specific destination and a purpose, the system 1 proceeds to the step 209.

In the step 209, the system 1 searches an alternative POI which can create a trip combinable with an ongoing trip. In the step 209, the system 1 uses the search engine of the POI database 25 to get surrounding or on-route POI that fulfills the purpose. The step 209 retrieves an alternative destination which meets the short-term needs of the user indicated by the trip determined in the step 207. For example, it is possible to retrieve a destination, such as a "gardening store" or a "movie theater playing the last James Bond movie" at a compatible time. Therefore, the step 209 functions as a module which retrieves an alternative trip to an alternative destination which may be considered compatible with the destination of the short-term trip.

The step 206 is performed for all potential combinable short-term trips. At the end of the step 206, if the short-term trip is described with only a specific destination, the system 1 gets a secondary trip to the specific destination. If the short-term trip is described with only a purpose, the system 1 gets a secondary trip to an alternative destination which is located on a surrounding or on-route area to the ongoing trip. If a short-term trip is described with both a specific destination and a purpose, the system 1 gets both a secondary trip to the specific destination and a secondary trip to an alternative destination.

In steps 210-213, the system 1 performs the same processing as described in the steps 102-105 respectively. In a step 214, the system 1 performs a re-route calculation for the trips combination accepted by the user in the step 213, and starts route guidance for the trips combination. For example, the navigation system 2 displays a map image with a route from a present position on a route of the ongoing trip to the destination of the secondary trip.

Figure 19:
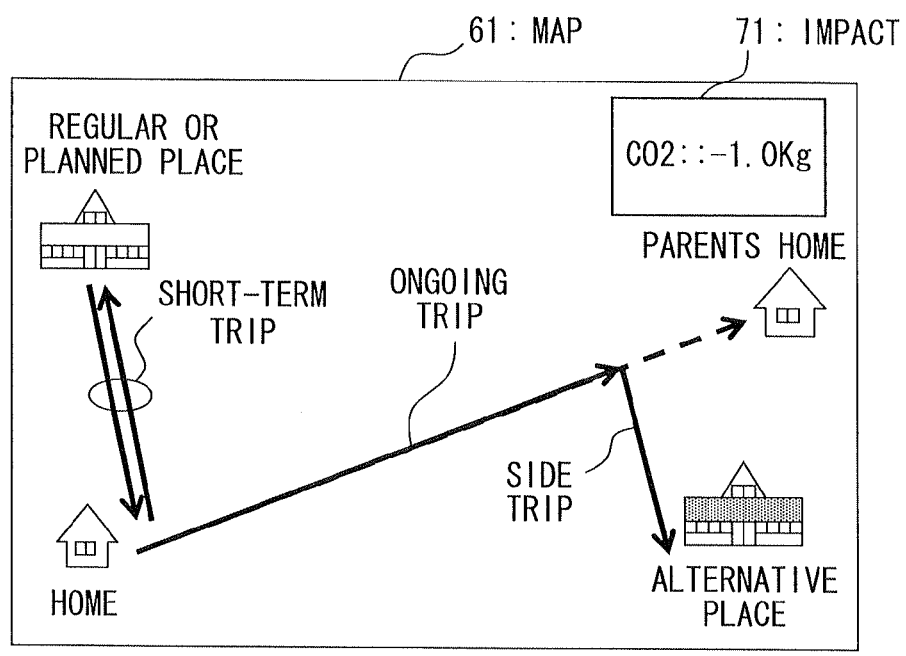
FIG. 19 is a plan view of a map showing an example of proposal of a side trip from an ongoing trip.

FIG. 19 is a plan view of a map 61 showing an example of proposal of a side trip from an ongoing trip. In the illustrated case, the system 1 retrieves a short-term trip to a regular or planned place, e.g. a supermarket, from the trips database 13. The system 1 retrieves an alternative place from the POI database 25. The alternative place has attributive information, such as the purpose, which is identical to the attributive information describing the short-term trip. Then, the system 1 calculates a route to the alternative place from the present position on the ongoing trip, and shows the calculated route on a display screen to propose a side trip to the alternative place. The system 1 may optionally display an impact 71, such as a reduction of $CO_2$ emission.

According to the real-time trips combination proposing module 200, the primary trip setting module 16 sets the ongoing trip as the primary trip. The secondary trip setting module 17 sets the regular trip or the planned trip stored in the trips database 13, or a trip to an alternative destination created based on the regular trip or the planned trip as the secondary trip. As a result, it is possible to propose a trips combination which reflects habits and/or plan of a user.

According to the real-time trips combination proposing module 200, it is possible to automatically propose a trips combination, such as a side trip from an ongoing trip. As a result, it is possible to support a user to plan a trips combination which may be advantageous in some aspect. In addition, it is possible to propose a trips combination which meets needs of a user. Especially, since a trip which meets short-term needs of a user is determined as a trip to be combined to the ongoing trip, the proposed trips combination is likely accepted by the user even during the ongoing trip.

Other Embodiments

In the above-mentioned embodiment, fixed values are used as the attributive information such as the maximum arrival time for describing the trip. Alternatively, a variable can be used as the attributive information. The variable may be adjusted according to conditions relevant to an operation of a vehicle. For example, the trip time length and the maximum arrival time may be adjusted according to the conditions. For this purpose, present conditions or estimated future conditions at a date and time on which the vehicle will be operated can be used as the condition. The conditions may be provided by traffic information and/or weather information. In such a case, the system 1 includes a module which retrieves traffic information from the communication module 22, and a module which corrects or calculates the trip time length and the maximum arrival time of the primary trip T1 and/or the secondary trip T2 based on the traffic information. In this configuration, the primary trip setting module 16 and the secondary trip setting module 17 arrange a trips combination based on the corrected primary trip T1 and/or the corrected secondary trip T2. According to the above configuration, it is possible to propose a trips combination by taking relevant conditions into consideration.

Although the regular trips combination proposing module 100 is configured to combine two regular trips, the module 100 may be configured to combine the regular trip and the planned trip, or two planned trips.

Although the above-mentioned embodiments combine two trips to create a trips combination three or more trips may be combined to create even more efficient trips combination.

The components and modules in the above embodiments may be provided by software, hardware or combination of them.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An apparatus for planning a trips combination for driving a vehicle, comprising:
    a non-transitory storage device; and
    at least one of a navigation system and a computer configured to communicate with the storage device;
    the storage device has a trips database which stores a plurality of trips including at least a regular trip described by attributive information which shows habits of a user and which includes frequency information (i) showing a daily, weekly, bi-weekly, or monthly periodic interval between similar trips, or (ii) indicating specific dates or dates of the trips;
    the at least one of the navigation system and the computer, sets, in a primary trip setting module, a primary trip to be combined into the trips combination;
    the at least one of the navigation system and the computer, sets, in a secondary trip setting module, a secondary trip combinable with the primary trip based on the attributive information stored in the trips database;
    the at least one of the navigation system and the computer evaluates, in an evaluating module, impact caused by the trips combination in which the primary trip and the secondary trip are combined; and
    the at least one of the navigation system and the computer proposes, in a proposing module, to a user, the trips combination in which the primary trip and the secondary trip are combined, wherein
    the proposing module proposes only the trips combination which is evaluated in the evaluating module to cause advantageous impact, the plurality of trips stored in the trips database include a plurality of regular trips, the primary trip setting module sets one of the regular trips stored in the trips database as the primary trip, the secondary trip setting module sets a regular trip as the secondary trip, the regular trip being another one of the regular trips stored in the trips database and being combinable with the primary trip, the proposing module proposes the trips combination which sequentially visits in a single route both destinations of the primary and secondary trips, and the frequency information, which describes the regular trip, is considered, in the secondary trip setting module, as an index indicative of flexibility which is a period of time in which the regular trip can be undertaken, and is used for setting the regular trip as the secondary trip.

2. The apparatus for planning a trips combination according to claim 1, wherein at least one of a minimum departure time, a maximum arrival time, a mean departure time, a mean arrival time a trip time length, a departure point, a destination point, a purpose, door operation, and number of passengers is contained in the attributive information, and is used for setting the secondary trip.

3. An apparatus for planning a trips combination for driving a vehicle, comprising:

a non-transitory storage device; and at least one of a navigation system and a computer configured to communicate with the storage device;

the storage device has a trips database which stores a plurality of trips including at least a regular trip described by attributive information which shows habits of a user and which includes frequency information (i) showing a daily, weekly, bi-weekly, or monthly periodic interval between similar trips, or (ii) indicating specific dates or days of the trips;

the at least one of the navigation system and the computer, sets, in a primary trip setting module, a primary trip to be combined into the trips combination;

the at least one of the navigation system and the computer, sets, in a secondary trip setting module, a secondary trip combinable with the primary trip based on the attributive information stored in the trips database;

the at least one of the navigation system and the computer evaluates, in an evaluating module, impact caused by the trips combination in which the primary trip and the secondary trip are combined; and the at least one of the navigation system and the computer proposes, in a proposing module, to a user, the trips combination in which the primary trip and the secondary trip are combined, wherein the proposing module proposes only the trips combination which is evaluated in the evaluating module to cause advantageous impact, the plurality of trips stored in the trips database include a planned trip indicating a plan of a user, the primary trip setting module sets a presently ongoing trip as the primary trip, the secondary trip setting module sets a destination point which is considered to be likely accepted by a user on the ongoing trip based on one of the trips stored in the trips database, and sets a trip to the destination point as the secondary trip, the proposing module proposes the trips combination which sequentially visits in a single route both destinations of the primary and secondary trips, and the frequency information, which describes the regular trip, is considered, in the secondary trip setting module, as an index indicative of flexibility which is a period of time in which the regular trip can be undertaken, and is used for setting the destination point which is considered to be likely accepted by a user on the ongoing trip based on the regular trip described by the frequency information.

4. The apparatus for planning a trips combination according to claim 3, wherein the secondary trip setting module selects a short-term trip, which would be taken soon, from the plurality of trips stored in the trips database based on attributive information stored in the trips database, sets a destination point which is considered to be likely accepted by a user on the ongoing trip based on attributive information of the short-term trip, and sets a trip to the destination point as the secondary trip.

5. The apparatus for planning a trips combination according to claim 3, wherein at least one of a minimum departure time, a maximum arrival time, a mean departure time, a mean arrival time a trip time length, a departure point, a destination point, a purpose, door operation, and number of passengers is contained in the attributive information, and is used for setting the secondary trip.

6. A method for planning a trips combination for driving a vehicle, comprising the steps of:

storing, by at least one of a navigation system and a computer, in a trips database a plurality of trips including at least a regular trip described by attributive information which shows habits of a user and which includes frequency information (i) showing a daily, weekly, bi-weekly, or monthly periodic interval between similar trips, or indicating specific dates or days of the trips;

setting, by the at least one of the navigation system and the computer, a primary trip to be combined into the trips combination;

setting, by the at least one of the navigation system and the computer, a secondary trip combinable with the primary trip based on the attributive information stored in the trips database;

evaluating, by at least one of the navigation system and the computer, impact caused by the trips combination in which the primary trip and the secondary trip are combined; and proposing, by the at least one of the navigation system and the computer, to a user, the trips combination in which the primary trip and the secondary trip are combined, wherein the proposing step proposes only the trips combination which is evaluated in the evaluating step to cause advantageous impact, the storing step stores a plurality of regular trips in the trips database, the primary trip setting step sets one of the regular trips stored in the trips database as the primary trip, the secondary trip setting step sets a regular trip as the secondary trip the regular trip being another one of the regular trips stored in the trips database and being combinable with the primary trip, the proposing step proposes the trips combination which sequentially visits in a single route both destinations of the primary and secondary trips, and the frequency information, which describes the regular grip, is considered, in the secondary trip setting step, as an index indicative of flexibility which is a period of time in which the regular trip can be undertaken, and is used for setting the regular trip as the secondary trip.

7. The method for planning a trips combination according to claim 6, wherein
at least one of a minimum departure time, a maximum arrival time, a mean departure time, a mean arrival time, a trip time length, a departure point, a destination point, a purpose, door operation, and number of passengers is contained in the attributive information, and is used for setting the secondary trip.

8. A method for planning a trips combination for driving a vehicle, comprising the steps of:
storing, by at least one of a navigation system and a computer, in a trips database a plurality of trips including at least a regular trip described by attributive information which shows habits of a user and which includes frequency information (i) showing a daily, weekly, bi weekly, or monthly periodic interval between similar trips, or (ii) indicating specific dates or days of the trips;
setting, by the at least one of the navigation system and the computer, a primary trip to be combined into the trips combination;
setting, by the at least one of the navigation system and the computer, a secondary trip combinable with the primary trip based on the attributive information stored in the trips database;
evaluating, by the at least one of the navigation system and the computer, impact caused by the trips combination in which the primary trip and the secondary trip are combined; and
proposing, by the at least one of the navigation system and the computer, to a user the trips combination in which the primary trip and the secondary trip are combined, wherein
the proposing step proposes only the trips combination which is evaluated in the evaluating module to cause advantageous impact,
the storing step stores a planned trip indicating a plan of a users in the trips database,
the primary trip setting step sets a presently ongoing trip as the primary trip,
the secondary trip setting step sets a destination point which is considered to be likely accepted by a user on the ongoing trip based on one of the trips stored in the trips database, and sets a trip to the destination point as the secondary trip,
the proposing step proposes the trips combination which sequentially visits in a single route both destinations of the primary and secondary trips, and
the frequency information, which describes the regular trip, is considered, in the secondary trip setting step, as an index indicative of flexibility which is a period of time in which the regular trip can be undertaken, and is used for setting the destination point which is considered to be likely accepted by a user on the ongoing trip based on the regular trip described by the frequency information.

9. The method for planning a trips combination according to claim 8, wherein
the secondary trip setting step selects a short-term trip, which would be taken soon, from the plurality of trips stored in the trips database based on attributive information stored in the trips database, sets a destination point which is considered to be likely accepted by a user on the ongoing trip based on attributive information of the short-term trip, and sets a trip to the destination point as the secondary trip.

10. The method for planning a trips combination according to claim 8, wherein
at least one of a minimum departure time, a maximum arrival time, a mean departure time, a mean arrival time, a trip time length, a departure point, a destination point, a purpose, door operation, and number of passengers is contained in the attributive information, and is used for setting the secondary trip.

11. A non-transitory computer readable storage medium storing a program product, which when executed, performs the steps of:
storing in a trips database a plurality of trips including at least a regular trip described by attributive information which shows habits of a user and which includes frequency formation (i) showing a daily, weekly, bi-weekly, or monthly periodic interval between similar trips, or (ii) indicating specific dates or days of the trips;
setting a primary trip to be combined into the trips combination;
setting a secondary trip combinable with the primary trip based on the attributive information stored in the trips database;
evaluating impact caused by the trips combination in which the primary trip and the secondary trip are combined, and
proposing to a user the trips combination in which the primary trip and the secondary trip are combined, wherein
the proposing step proposes only the trips combination which is evaluated in the evaluating module to cause advantageous impact,
the storing step stores a plurality of regular trips in the trips database,
the primary trip setting step sets one of the regular trips stored in the trips database as the primary trip,
the secondary trip setting step sets a regular trip as the secondary trip, the regular trip being another one of the regular trips stored in the trips database and being combinable with the primary trip,
the proposing step proposes the trips combination which sequentially visits in a single route both destinations of the primary and secondary trips,
and the frequency information, which describes the regular trip, is considered, in the secondary rip setting step, as an index indicative of flexibility which is a period of time which the regular trip can be undertaken, and is used for setting the regular trip as the secondary trip.

12. The non-transitory computer readable storage medium according to claim 11, wherein
at least one of a minimum departure time, a maximum arrival time, a mean departure time, a mean arrival time, a trip time length, a departure point, a destination point, a purpose, door operation, and number of passengers is contained in the attributive information, and is used for setting the secondary trip.

13. A non-transitory computer readable storage medium storing a program product, which when executed, performs the steps of:
storing in a trips database a plurality of trips including at least a regular trip described by attributive information which shows habits of a user and which includes frequency information (i) showing a daily, weekly, bi-weekly, or monthly periodic interval between similar trips, or (ii) indicating specific dates or days of the trips;
setting a primary trip to be combined into the trips combination;

setting a secondary trip combinable with the primary trip based on the attributive information stored in the trips database;

evaluating impact caused by the trips combination in which the primary trip and the secondary trip are combined; and proposing to a user the trips combination in which the primary trip and the secondary trip are combined, wherein the proposing step proposes only the trips combination which is evaluated in the evaluating step to cause advantageous impact, the storing step stores a planned trip indicating a plan of a users in the trips database, the primary trip setting step sets a presently ongoing trip as the primary trip, the secondary trip setting step sets a destination point which is considered to be likely accepted by a user on the ongoing trip based on one of the trips stored in the trips database, and sets a trip to the destination point as the secondary trip, the proposing step proposes the trips combination which sequentially visits in a single route both destinations of the primary and secondary trips, and the frequency information, which describes the regular trip, is considered, in the secondary trip setting step, as an index indicative of flexibility which is a period of time in which the regular trip can be undertaken, and is used for setting the destination point which is considered to be likely accepted by a user on the ongoing trip based on the regular trip described by the frequency information.

14. The non-transitory computer readable storage medium according to claim 13, wherein the secondary trip setting step selects a short-term trip, which would be taken soon, from the plurality of trips stored in the trips database based on attributive information stored in the trips database sets a destination point which is considered to be likely accepted by a user on the ongoing trip based on attributive information of the short-term trip, and sets a trip to the destination point as the secondary trip.

15. The non-transitory computer readable storage medium according to claim 13, wherein at least one of a minimum departure time, a maximum arrival time, a mean departure time, a mean arrival time, a trip time length, a departure point, a destination point, a purpose, door operation, and number of passengers is contained in the attributive information, and is used for setting the secondary trip.

* * * * *